United States Patent [19]
Rutschmann et al.

[11] Patent Number: 5,515,827
[45] Date of Patent: May 14, 1996

[54] MULTICYLINDER, FOUR-STROKE INTERNAL-COMBUSTION ENGINE HAVING THREE INTAKE VALVES AND ONE EXHAUST VALVE PER CYLINDER

[75] Inventors: Erwin Rutschmann, Tiefenbronn; Claus Bruestle, Gerlingen; Frank Ickinger, Pleidelsheim, all of Germany

[73] Assignee: Dr. Ing. h.c.F. Porsche AG, Germany

[21] Appl. No.: 307,159

[22] Filed: Sep. 16, 1994

[30] Foreign Application Priority Data

Sep. 22, 1993 [DE] Germany ............ 43 32 198.4

[51] Int. Cl.⁶ .................. F01L 1/26; F02M 35/10
[52] U.S. Cl. .............. 123/432; 123/90.16; 123/90.27
[58] Field of Search .............. 123/432, 90.27, 123/90.16, 308

[56] References Cited

U.S. PATENT DOCUMENTS

| | | |
|---|---|---|
| 4,679,532 | 7/1987 | Aoi . |
| 5,205,259 | 4/1993 | Clarke et al. ............ 123/432 |
| 5,235,940 | 8/1993 | Nakatani ............ 123/90.27 |

FOREIGN PATENT DOCUMENTS

| | | |
|---|---|---|
| 0063385 | 10/1982 | European Pat. Off. . |
| 0105934 | 4/1984 | European Pat. Off. ........ 123/432 |
| 0470874A1 | 2/1992 | European Pat. Off. . |
| 2512493 | 3/1983 | France . |
| 2339356 | 3/1975 | Germany . |
| 3508763 | 1/1986 | Germany . |
| 3724495 | 2/1989 | Germany . |
| WO90/05842 | 5/1990 | WIPO . |

*Primary Examiner*—Erick R. Solis
*Attorney, Agent, or Firm*—Evenson, McKeown, Edwards & Lenahan

[57] ABSTRACT

A multicylinder, four-stroke internal-combustion engine is spark-ignited and has three intake valves and one exhaust valve which interact in the combustion chamber with valve openings having valve opening centers. The valve opening centers are situated on both sides of a longitudinal center plane of the internal-combustion engine. The valves are arranged so that a first intake valve and a second intake valve with their valve opening centers are situated on one side of the longitudinal center plane, whereas a third intake valve and the exhaust valve with their valve opening centers are situated on the other side of the longitudinal center plane.

17 Claims, 4 Drawing Sheets

MULTICYLINDER, FOUR-STROKE INTERNAL-COMBUSTION ENGINE HAVING THREE INTAKE VALVES AND ONE EXHAUST VALVE PER CYLINDER

BACKGROUND AND SUMMARY OF THE INVENTION

The present invention relates to an internal-combustion engine, and more particularly, to a four-stroke IC engine comprising three intake valves and one exhaust valve per cylinder actuated by camshafts arranged in a cylinder head and acting, via associated valve disks, upon valve openings of a combustion chamber, the valve openings having different diameters from each other and valve opening centers situated on both sides of a longitudinal center plane.

Internal-combustion engines having a multiple valve arrangement per cylinder, that is, more than one intake valve and exhaust valve, are well known. For example, German Patent DE-OS 28 38 681 uses two intake valves and one exhaust valve per cylinder combustion chamber, whereby one intake valve operates in the partial-load range and the other intake valve operates in the remaining load range.

European Patent EP 0 063 3851 B1 shows a four-stroke internal-combustion engine in which three intake valves and two exhaust valves operate in its respective combustion chamber by way of which the load per se and the load change during the operation of the internal-combustion engine are intended to be improved.

Furthermore, the construction shown in German Patent Document DE 37 24 495 A1 provides three intake valves and one exhaust valve per cylinder. The mixture is ignited by two spark plugs. This construction is intended to achieve a high volumetric efficiency with a good output.

It is an object of the present invention to provide a multivalve arrangement for an advanced-design, four-stroke internal-combustion engine which, while using three intake valves and one exhaust valve, improves the operation of this internal-combustion engine with respect to fuel consumption and exhaust gas emission while maintaining good output and high torque, and ensuring that the constructional expenditures are within acceptable limits.

This object has been achieved according to the present invention by providing that the intake valves and exhaust valve of each cylinder are arranged such that the valve opening centers of the valve openings of first and second valves of the intake valves are situated on one side of the longitudinal center plane, whereas the valve opening centers of the valve openings of the third intake valve and of the exhaust valve are situated on another side of the longitudinal center plane.

The principal advantages achieved with the present invention are that the three intake valves and the exhaust valve represent, an optimum construction between three-valve technology (two intake valves, one exhaust valve) and five-valve technology (three intake valves, two exhaust valves). The multivalve configuration of the present invention requires only two preexisting camshafts.

It is important feature of the present invention that the third intake valve is arranged on the side of the exhaust valve which leads to a desired fast heating of the suction pipe connected with this partial-load valve. In other words, the above-mentioned valve arrangement is a recognition of the advantages of combining the cross-flow principle and the uni-flow principle in the cylinder head.

Because of its clear and simple concept, the valve arrangement of the present invention is also easily implemented in ongoing internal-combustion engine developments. In addition, the first intake valve and the second intake valve are constructed to be controllable by control elements which may, for example, be hydraulic tappets connected between the camshaft and these intake valves, as described in European Patent PCT/EP92/00502. As a result, the power, the torque, the consumption and the exhaust emission of the internal-combustion engine may be influenced in a favorable manner. The construction of the present invention takes place in connection with separate suction pipes for the first and the second intake valve or the third intake valve, in which case the suction pipe of the third intake valve can be integrated into the cylinder head cover at least in sections.

Finally, the four valves are arranged in the combustion chamber such that advantageous conditions are created from the point of view of space, also in connection with mutually separate suction pipes.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
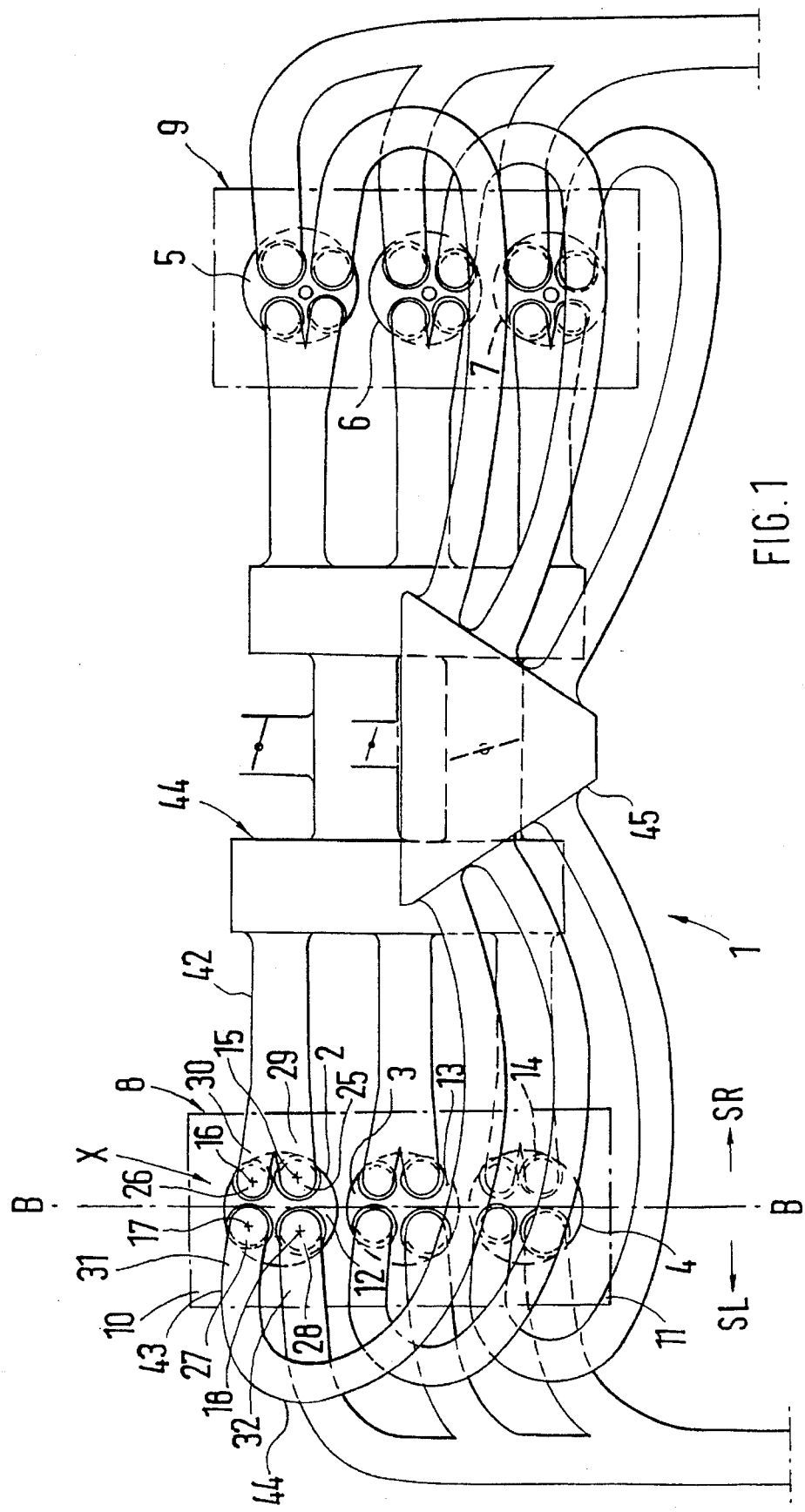
FIG. 1 is a schematic plan view of a multicylinder internal-combustion engine with the multiple valve arrangement according to the present invention.
Figure 2:
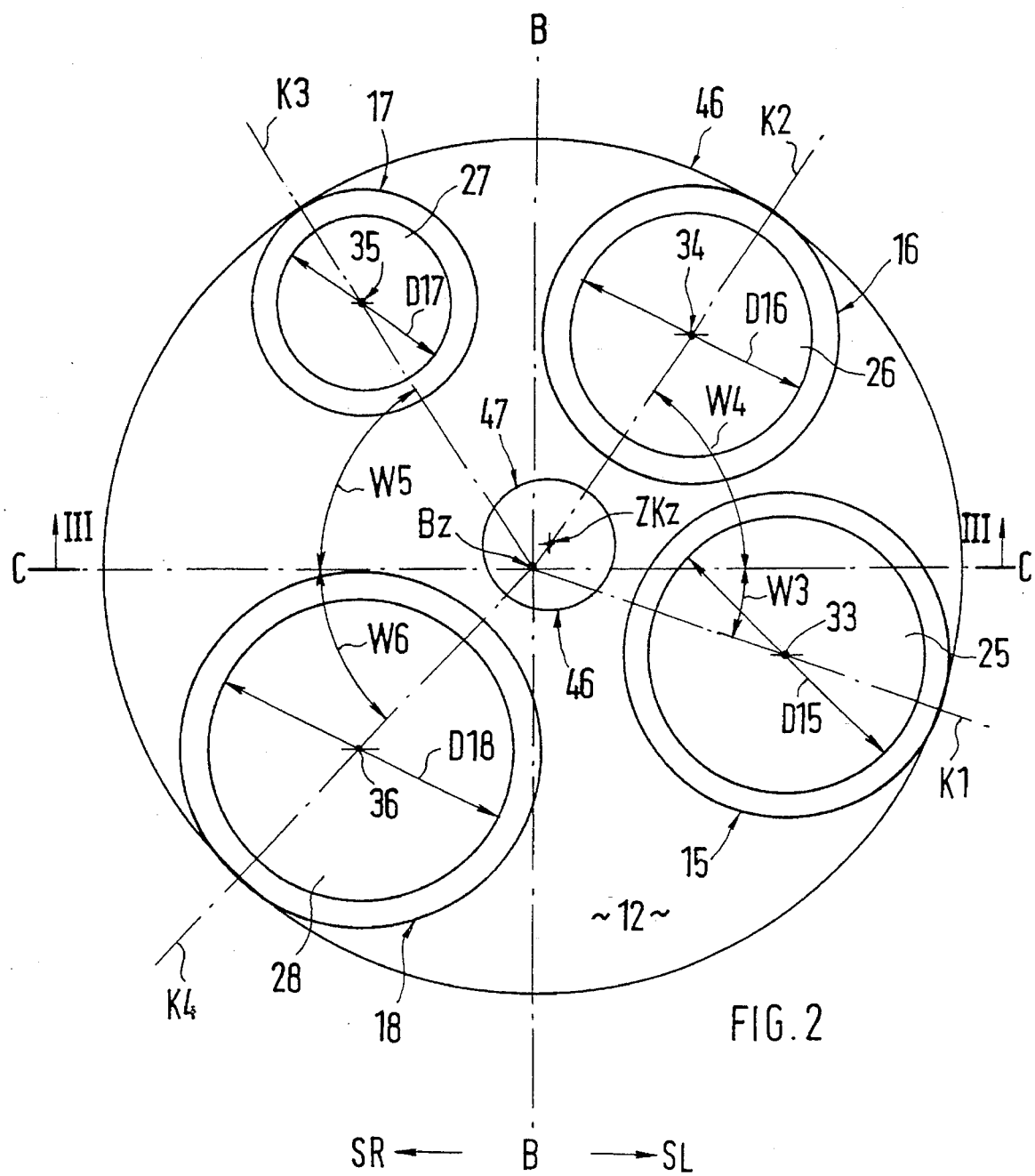
FIG. 2 is an enlarged view of a detail X of FIG. 1.
Figure 3:
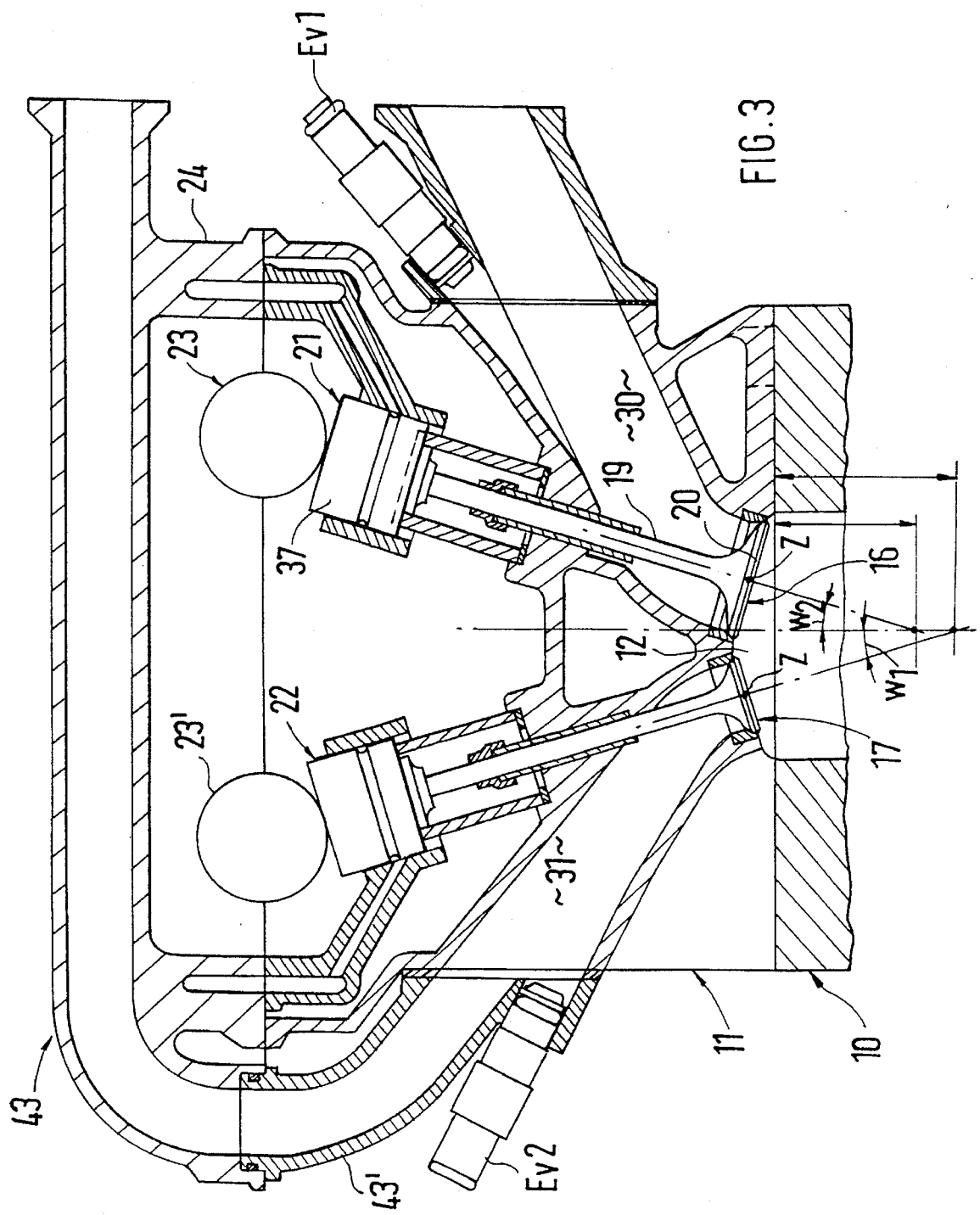
FIG. 3 is a sectional view along line III—III of FIG. 2.

Referring now to the drawings and, in particular, FIG. 1, there is shown an internal-combustion engine designated generally by numeral 1 of the piston-type with spark ignition having several cylinders 2, 3, 4 and 5, 6, 7 in respective opposite cylinder banks 8, 9. The cylinders 2, 3, 4 are housed in a cylinder block and crankcase 10 which comprises a cylinder head 11 and combustion chambers 12, 13, 14. Charge cycle valves operate in each combustion chamber 12 which are represented by three intake valves, specifically a first intake valve 15, a second intake valve 16 and a third intake valve 17 as well as an exhaust valve 18. These valves, for example, the second intake valve 16 and the third intake valve 17, are lifting valves with a valve stem 19 and a valve disk 20 as seen in FIG. 3. All valves interact via hydraulic tappets 21, 22 and associated respective camshafts 23, 23' which are arranged in the cylinder head 11 or between the cylinder 11 and a cylinder head cover 24 which covers the cylinder head 11. The valve disks 20 of the valves 15, 16, 17 and 18 affect valve openings 25, 26, 27, 28 which bound intake ports 29, 30, 31 and an exhaust port 32 with respect to the combustion chamber 12. The valve openings 25, 26, 27, 28 surround valve opening centers 33, 34, 35, 36 as best seen in FIG. 2. Ev1 and Ev2 shown in FIG. 3 are injection valves for the intake valves 16 and 17.

The valve opening centers 33, 34 of the respective first intake valve 15 and the second intake valve 16 are situated on one side SR of a longitudinal center plane B—B of the internal-combustion engine 1 which may include, for example, a center line of a conventional crankshaft (not shown). In contrast, the valve opening centers 35, 36 of the third intake valve 17 and of the exhaust valve 18 are arranged on the other side SL of the longitudinal center plane B—B. As seen in FIG. 3, the valves 16, 17 are arranged diagonally in the cylinder head 10, their angles $w_1$ and $w_2$ with respect to the longitudinal center plane B—B being approximately identical, i.e. $w_1=w_2$.

Referring now to FIG. 2, the diameter D17 of the valve opening 27 of the third valve 17 is smaller than the diameters D15, D16 of the other respective intake valves 15, 16, but the diameter D16 of the valve opening 26 of the second intake valve 16 is smaller than the diameter D15 of the valve opening 25 of the first intake valve 15. The valve opening 28 of the exhaust valve 18 is larger than each of the valve openings of the intake valves, with the size of all of the valves being determined mathematically/iteratively or empirically.

The third intake valve 17 and, for that matter, also the exhaust valve 18 are permanently actuated by the camshaft 23', seen in FIG. 3, during the operation of the internal-combustion engine 1, whereas, the first intake valve 15 and the second intake valve 16 are connected and disconnected by control elements 37 during the operation of the internal-combustion engine. Control elements of this type are known and described in European Patent PCT/EP92/00502, and effect a connection, for example, as a function of the load and rotational speed.

Figure 4:
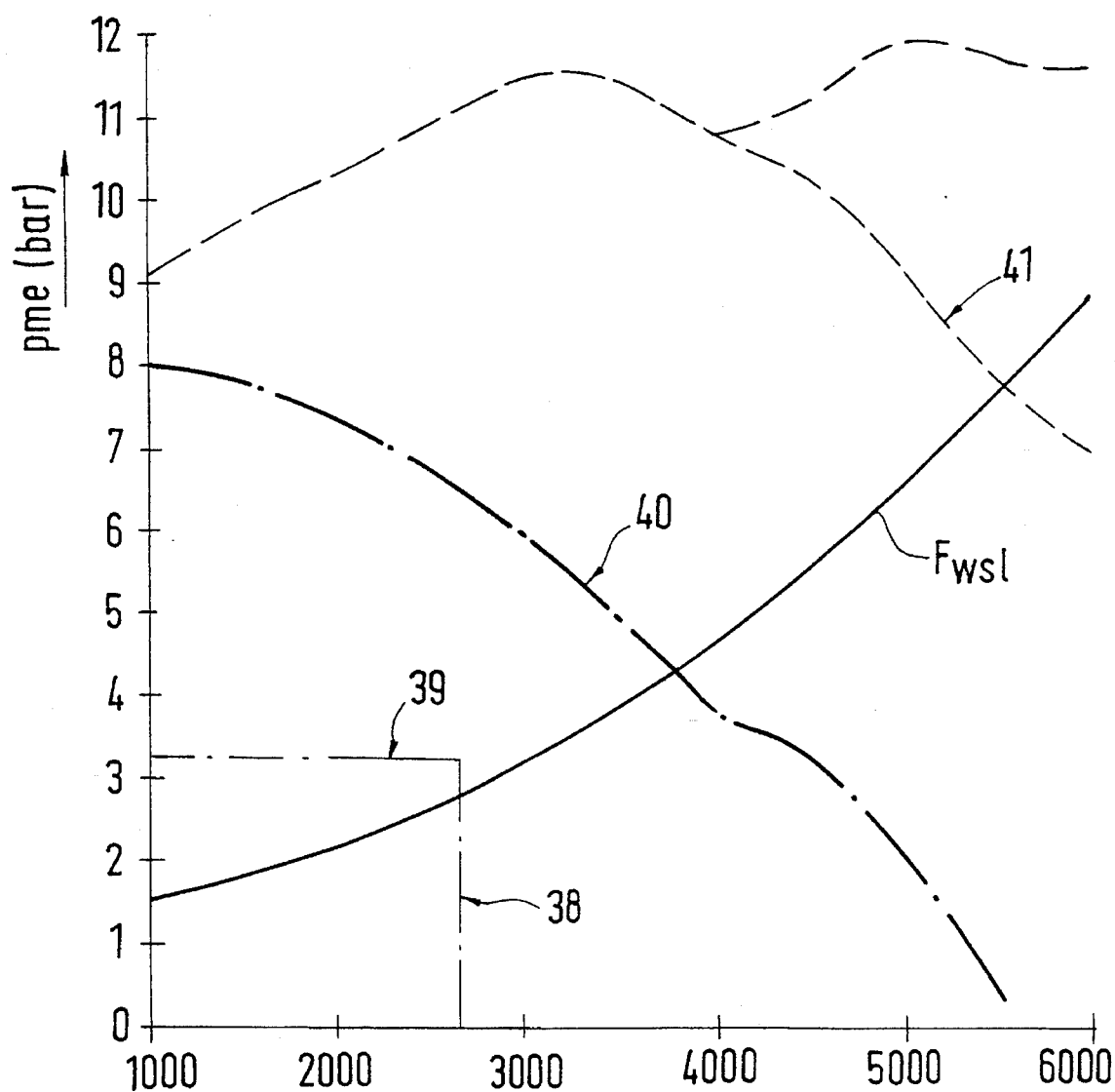
FIG. 4 is a diagram illustrating operating conditions of the internal-combustion engine constructed according to the present invention.

FIG. 4 is a diagram in which the rotational speed (1/min) is represented on the abscissa and the medium pressure (pme) is represented on the ordinate. A perpendicular and a horizontal line 38, 39 bound a field area which represents a favorable consumption and a more favorable mass emission. A dot-dash line 40 represents a first full-load line below which only the third intake valve 17 operates. On the other side of this first full-load line 40, the second intake valve 16 is connected, via the control element 37, so that then the third intake valve 17 and the second intake valve 16 operate jointly. Also, another full load line represented by dash line 41 is entered in the diagram, starting with which all intake valves 15, 16, 17 become operative. A tractive resistance line of a motor vehicle is indicated by solid line designated Fwsl.

According to FIG. 1, a medium, e.g. a fuel-air mixture, is supplied to the first intake valve 15 and to the second intake valve 16 via a first direction suction pipe 42 and to the third intake valve 17 via a second suction pipe 43. The second suction pipe 43 may be constructed as a bypass pipe with about a 90° bend 44. However, it is also possible to integrate the suction pipe 43 into the cylinder head cover 24 (FIG. 3) in which case both constructions traverse the cylinder head 11. Reference number 43' in FIG. 3 indicates a separate connecting pipe piece between the suction pipe 43 and the cylinder head 11.

The first suction pipe 42 is a component of a first suction system 44, and the second suction pipe 43 is a component of a second suction system 45. Both suction pipe systems 44, 45 are separated from one another. In this case, the first suction pipe 42 is relatively short and has a relatively large cross-section for use in the full-load range, whereas the second suction pipe 43 is relatively long and has a relatively small cross-section for use in the partial-load range.

According to FIG. 2, the valve opening centers 33, 34 35, 36 are arranged within a circumferential line 46 of the combustion chamber 13, in which a transverse plane C—C of the internal-combustion engine 1 which extends perpendicularly with respect to the longitudinal center plane B—B includes a combustion chamber center Bz. The valve opening centers 33, 34, 35, 36 are situated on respective radial construction lines K1, K2, K3, K4 which intersect the combustion chamber center Bz and extend at the following angles with respect to the transverse plane C—C:

The angle $w_3$ for the valve opening center 33 of the valve opening 25 of the first intake valve 15 is between 15° and 25°;

the angle $w_4$ for the valve opening center 34 of the valve opening 26 of the second intake valve 16 is between 50° and 60°;

the angle $w_5$ for the valve opening center 35 of the valve opening 27 of the third intake valve 17 is between 50° and 60°;

the angle $w_6$ for the valve opening center 36 of the valve opening 28 of the exhaust valve 18 is between 40° and 50°.

The circumferential line 46' represents a spark plug bore 47 in the combustion chamber 12, with the spark plug center ZKz being situated in the proximity or area of the combustion chamber center Bz.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An internal-combustion engine of four-stroke construction comprising three intake valves and one exhaust valve per cylinder actuated by camshafts arranged in a cylinder head and acting, via associated valve disks, upon valve openings of a combustion chamber, the valve openings having diameters different from each other and valve opening centers situated on both sides of a longitudinal center plane, wherein the valves are arranged such that the valve opening centers of the valve openings of a first and a second of the intake valves are situated on one side of the longitudinal center plane, whereas the valve opening centers of the valve openings of the third intake valve and of the exhaust valve, which are permanently actuatable by an associated camshaft, are situated on another side of the longitudinal center plane, and at least one of the first and second intake valves is selectively connectable with the associated camshaft as a function of predetermined parameters of the engine.

2. The internal-combustion engine according to claim 1, wherein the valves are arranged, as viewed in a cross-section of the cylinder head, at an angle to the longitudinal center plane, and the second intake valve and the third intake valve are arranged approximately at the same angle with respect to the longitudinal center plane.

3. The internal-combustion engine according to claim 1, wherein a diameter of the valve opening of the third intake valve is smaller than the diameters of the first and second intake valves.

4. An internal-combustion engine of four-stroke construction comprising three intake valves and one exhaust valve per cylinder actuated by camshafts arranged in a cylinder head and acting, via associated valve disks, upon valve openings of a combustion chamber, the valve openings having diameters different from each other and valve opening centers situated on both sides of a longitudinal center plane, wherein the valves are arranged such that the valve opening centers of the valve openings of a first and a second of the intake valves are situated on one side of the longitudinal center plane, whereas the valve opening centers of the valve openings of the third intake valve and of the exhaust valve are situated on another side of the longitudinal center plane, and at least one of the intake valves is selectively connectable with the associated camshaft as a function of predetermined parameters of the engine, wherein the diameter of the valve opening of the second intake valve is larger than the diameter of the valve opening of the third intake valve, but the diameter of the second intake valve is smaller than the diameter of the valve opening of the first intake valve.

5. The internal-combustion engine according to claim 1, wherein the third intake valve is arranged to be permanently actuated during operation of the internal-combustion engine.

6. The internal-combustion engine according to claim 1, wherein the at least one of the first intake valve and the second intake valve are selectively connectable via control elements arranged in the engine so as to be actuated as a function of the engine parameters comprising load and rotational speed.

7. The internal-combustion engine according to claim 6, wherein the third intake valve is arranged to be permanently actuated during operation of the internal-combustion engine.

8. The internal-combustion engine according to claim 1, wherein a medium is supplied to the first intake valve and to the second intake valve via a first direct suction pipe and to the third intake valve via a second suction pipe traversing the cylinder head.

9. The internal-combustion engine according to claim 8, wherein the second suction pipe is integrated into a cylinder head cover.

10. The internal-combustion engine according to claim 8, wherein the first suction pipe and the second suction pipe are each a component of separate suction systems.

11. The internal-combustion engine according to claim 10, wherein the second suction pipe is integrated into a cylinder head cover.

12. The internal-combustion engine according to claim 1, wherein a cylinder combustion chamber is bounded, as viewed from above the engine, by a circumferential line and comprises a combustion chamber center through which passes a transverse plane of the associated cylinder head, and the valve opening centers of the valve openings are situated on radial construction lines which intersect the combustion chamber center and are arranged at an angle with respect to the transverse plane, whereby the angle for the valve opening center of the valve opening of the first intake valve is between about 15° and 25°; the angle for the valve opening center of the valve opening of the second intake valve is between about 50° and 60°; the angle for the valve opening center of the valve opening of the third intake valve is between about 50° and 60°; and the angle for the valve opening center of the valve opening of the exhaust valve is between about 40° and 50°.

13. The internal-combustion engine according to claim 12, wherein a cylinder further comprises a spark plug bore having a spark plug center and the combustion chamber has a combustion chamber center, whereby the spark plug center is situated adjacent to the combustion chamber center in the combustion chamber.

14. A process for operation of an internal-combustion engine of four-stroke construction comprising three intake valves and one exhaust valve per cylinder actuated by camshafts arranged in a cylinder head and acting, via associated valve disks, upon valve opening of a combustion chamber, the valve openings having different diameters from each other and valve opening centers situated on both sides of a longitudinal center plane, wherein the valves are arranged such that the valve opening centers of the valve openings of a first and a second of the intake valves are situated on one side of the longitudinal center plane, whereas the valve opening centers of the valve openings of the third intake valve and of the exhaust valve are situated on aonother side of the longitudinal center plane, comprising the steps of operating the first intake valve above a first load line and operating the second intake valve above a second load line in which the first and second load lines represent engine operating parameters.

15. A cylinder for and internal-combustion engine, comprising a combustion chamber with valve opening for three intake valves and one exhaust valve, wherein the valves are arranged such that the valve opening centers of the valve openings of a first and a second of the intake valves are situated on one side of a longitudinal center plane, whereas the valve opening centers of the valve opening of the third intake valve and of the exhaust valve, which are permanently actuatable by the engine, are situated on another side of the longitudinal center plane, and at least one of the first and second intake valves is selectively connectable with the engine as a function of predetermined parameters of the engine.

16. The cylinder according to claim 15, wherein the combustion chamber is bounded by a circumferential line and comprises a combustion chamber center through which passes a transverse plane of the associated cylinder head, and the valve opening centers of the valve openings are situated on radial construction lines which intersect the combustion chamber center and are arranged at an angle with respect to the transverse plane, whereby the angle for the valve opening center of the valve opening of the first intake valve is between about 15°and 60°; the angle for the valve opening center of the valve opening of the third intake valve is between about 50°and 60°; and the angle for the valve opening center of the valve opening of the exhaust valve is between about 40°and 50°.

17. The cylinder according to claim 16, wherein the cylinder further comprises a spark plug bore having a spark plug center and the combustion chamber has a combustion chamber center, whereby the spark plug center is situated adjacent to the combustion chamber center in the combustion chamber.

* * * * *